(12) United States Patent
Natsume (10) Patent No.: US 9,810,316 B2
(45) Date of Patent: Nov. 7, 2017

(54) CONTROL APPARATUS AND CONTROL METHOD FOR AUTOMATIC TRANSMISSION

(71) Applicant: TOYOTA JIDOSHA KABUSHIKI KAISHA, Toyota-shi, Aichi-ken (JP)

(72) Inventor: Hiroshi Natsume, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/290,390

(22) Filed: Oct. 11, 2016

(65) Prior Publication Data

US 2017/0108117 A1 Apr. 20, 2017

(30) Foreign Application Priority Data

Oct. 15, 2015 (JP) ................................. 2015-204053

(51) Int. Cl.
F16H 61/02 (2006.01)
F16H 59/44 (2006.01)
F16H 3/66 (2006.01)

(52) U.S. Cl.
CPC ......... *F16H 61/0204* (2013.01); *F16H 59/44* (2013.01); *F16H 61/0213* (2013.01); *B60Y 2300/184* (2013.01); *F16H 3/663* (2013.01); *F16H 3/666* (2013.01); *F16H 2061/0234* (2013.01); *F16H 2200/006* (2013.01); *F16H 2200/2007* (2013.01); *F16H 2200/2023* (2013.01); *F16H 2200/2046* (2013.01); *F16H 2200/2066* (2013.01); *F16H 2200/2082* (2013.01)

(58) Field of Classification Search
None
See application file for complete search history.

(56) References Cited

U.S. PATENT DOCUMENTS

| 4,102,222 A * | 7/1978 | Miller ................. F16H 61/0204 477/120 |
| 2006/0006008 A1* | 1/2006 | Brunemann ............. B60K 6/48 180/65.25 |
| 2012/0123654 A1* | 5/2012 | Byerly ................ F16H 61/0437 701/60 |

FOREIGN PATENT DOCUMENTS

JP 2010-112434 A 5/2010

* cited by examiner

*Primary Examiner* — Edwin A Young
(74) *Attorney, Agent, or Firm* — Oliff PLC (57) ABSTRACT

When throttle valve opening degree is larger than predetermined throttle valve opening degree Y in the case where a decision on shift to gear stage at which maximum load is applied to predetermined rotary member of automatic transmission is made, the gear stage is not formed. Therefore, large load is restrained from being applied to the predetermined rotary member of the automatic transmission. Besides, gear stage that is lower in vehicle speed than the gear stage by one stage or gear stage that is higher in vehicle speed than the gear stage by one stage is formed depending on whether acceleration requirement is large or small. Therefore, driving torque corresponding to the acceleration requirement is likely to be obtained. In consequence, the load applied to the predetermined rotary member of the automatic transmission can be reduced, and feeling of strangeness can be restrained from being caused by the driving torque.

9 Claims, 5 Drawing Sheets

| | C1 | C2 | C3 | C4 | B1 | B2 | F1 |
|---|---|---|---|---|---|---|---|
| P | | | | | | | |
| Rev | | | ○ | | | ○ | |
| N | | | | | | | |
| 1st | ○ | | | | | ◎ | ○ |
| 2nd | ○ | | | ○ | | | |
| 3rd | ○ | | ○ | | | | |
| 4th | ○ | | | ○ | | | |
| 5th | ○ | ○ | | | | | |
| 6th | | ○ | | ○ | | | |
| 7th | | ○ | ○ | | | | |
| 8th | | ○ | | | ○ | | |

○ : ENGAGED   ◎ : ENGAGED WHEN DRIVEN

CONTROL APPARATUS AND CONTROL METHOD FOR AUTOMATIC TRANSMISSION

INCORPORATION BY REFERENCE

The disclosure of Japanese Patent Application No. 2015-204053 filed on Oct. 15, 2015 including the specification, drawings and abstract is incorporated herein by reference in its entirety.

BACKGROUND

1. Technical Field

The disclosure relates to a control apparatus and a control method for an automate transmission in which a plurality of gear stages having different gear ratios are selectively formed.

2. Description of Related Art

A control apparatus for an automatic transmission in which a plurality of gear stages having different gear ratios are selectively formed is well known. For example, a shift control apparatus described in Japanese Patent Application Publication No. 2010-112434 (JP 2010-112434 A) is such an example. In this Japanese Patent Application Publication No. 2010-112434 (JP 2010-112434 A), it is described that either first shift control for making shifts by stages or second shift control for making a shift skipping a stage (i.e., making a skip shift) can be performed in making a shift from a current shift stage (which is synonymous with a current gear stage) to a shift stage that is higher in vehicle speed (higher) by two stages in shift control of an automatic transmission. In addition, in this Japanese Patent Application Publication No. 2010-112434 (JP 2010-112434 A), it is described that a fuel consumption amount when the current shift stage is shifted to the shift stage that is higher in vehicle speed by two stages through first shift control is calculated, that a fuel consumption amount when the current shift stage is shifted to the shift stage that is higher in vehicle speed by two stages through second shift control is calculated, and that a shift to the shift stage that is higher in vehicle speed by two stage is made through shift control with the smaller one of the fuel consumption amounts.

SUMMARY

By the way, in an automatic transmission, a torque obtained by amplifying (or damping) an input torque at a predetermined torque ratio that differs depending on a gear stage (i.e., a torque obtained by multiplying the input torque by a predetermined number) is transmitted to each rotary member. In a more multi-staged automatic transmission, it is known that the predetermined torque ratio in a specific rotary member is likely to become larger than 1 at a specific gear stage. Therefore, the load applied to the specific rotary member becomes large in some cases. In such an automatic transmission, it is conceivable to reduce the load applied to the specific rotary member by limiting the input torque (which is synonymous with a driving force source torque such an engine torque or the like) only at the specific gear stage. However, when the input torque is limited, a required driving torque cannot be satisfied, and the power performance may deteriorate. On the other band, as is the case with the art described in Japanese Patent Application Publication No. 2010-112434 (JP 2010-112434 A), it is conceivable to reduce the load applied to the specific rotary member through shift control, without limiting the input torque. For example, when the art described in Japanese Patent Application Publication No. 2010-112434 (JP 2010-112434 A) is applied, it is conceivable to reduce the load applied to the specific rotary member by making a shift to that one of the two gear stages as shift destinations at which the predetermined torque ratio in the specific rotary member is the smaller. However, in this case, the specific gear stage is not formed, so a driving torque that ought to be obtained through the shift is not balanced with an actual driving torque. As a result, a driver may develop a feeling of strangeness.

It is an object of the disclosure to provide a control apparatus and a control method for an automatic transmission that make it possible to reduce the load applied to a predetermined rotary member of the automatic transmission and restrain a feeling of strangeness from being caused by a driving torque.

In a first aspect of the disclosure, (a) there is provided a control apparatus for an automatic transmission with which a vehicle is equipped and in which a plurality of gear stages having different gear ratios are selectively formed. The control apparatus is equipped with a shift control unit that determines a shift of the automatic transmission by determining whether or not changeover control of the gear stages of the automatic transmission is performed using a predetermined relationship. (b) The control apparatus is equipped with an acceleration requirement determination unit that determines whether or not a drive requirement amount is larger than a predetermined requirement amount, and that determines whether an acceleration requirement is large or small, based on whether a change in the drive requirement amount is larger or smaller than a predetermined requirement amount change, when it is determined that the drive requirement amount is larger than the predetermined requirement amount. (c) The shift control unit forms a gear stage that is lower in vehicle speed than a predetermined gear stage by one stage when it is determined that the acceleration requirement is large, and forms a gear stage that is higher in vehicle speed than the predetermined gear stage by one stage when it is determined that the acceleration requirement is small, in a case where the shift control unit determines that a shift to the predetermined gear stage, at which a maximum load is applied to a predetermined rotary member of the automatic transmission, is to be performed.

Besides as a second aspect of the disclosure, in the control apparatus for the automatic transmission according to the first aspect of the disclosure, the shift control unit may hold the gear stage that is lower in vehicle speed by one stage when it is determined that the acceleration requirement is large, and may make an upshift to the gear stage that is higher in vehicle speed by one stage when it is determined that the acceleration requirement is small, in a case where the shift control unit determines that an upshift from the gear stage that is lower in vehicle speed by one stage to the predetermined gear stage is to be performed.

Besides, as a third aspect of the disclosure, the control apparatus for the automatic, transmission according to the first aspect of the disclosure may be equipped with a running state determination unit that determines whether or not a running state of the vehicle is a predetermined running state where the drive requirement amount has remained larger than the predetermined requirement amount, a vehicle speed has risen, and a predetermined time or less has elapsed since an upshift from a gear stage that is lower in vehicle speed than the predetermined gear stage by two stages to the gear stage that is lower in vehicle speed by one stage. The shift control unit may make an upshift to the predetermined gear stage when it is determined that the drive requirement amount is larger than the predetermined requirement amount and that the running state of the vehicle is the predetermined running state, in a case where the shift control unit determines that an upshift from the gear stage that is lower in vehicle speed by one stage to the predetermined gear stage is to be performed.

Besides, as a fourth aspect of the disclosure, in the control apparatus for the automatic transmission wording to the first aspect of the disclosure, the shift control unit may make a downshift to the gear stage that is lower in vehicle speed by one stage when it is determined that the acceleration requirement is large, and may hold the gear stage that is higher in vehicle speed by one stage when it is determined that the acceleration requirement is small, in a case where the shift control unit determines that a downshift from the gear stage that is higher in vehicle speed by one stage to the predetermined gear stage is to be performed.

Besides, as a fifth aspect of the disclosure, in the control apparatus for the automatic transmission according to the first aspect of the disclosure, the shift control mat may hold the gear stage that is lower in vehicle speed by one stage when the shift control unit determines that a shift to the gear stage that is lower in vehicle speed by one stage is to be performed, and may make an upshift to the gear stage that is higher in vehicle speed by one stage when the shift control unit determines that a shill to the gear stage that is higher in vehicle speed by one stage is to be performed, in a state where the gear stage that is lower in vehicle speed by one stage is formed after the shill control unit determines that a shift to the predetermined gear stage is to be performed.

Besides, as a sixth aspect of the disclosure, in the control apparatus for the automatic transmission according to the first aspect of the disclosure, the shift control unit may hold the gear stage that is higher in vehicle speed by one stage when the shift control unit determines that a shift to the gear stage that is higher in vehicle speed by one stage is to be performed, and may make a downshift to the gear that is lower in vehicle speed by one stage when the shift control unit determines that a shift to the gear stage that is lower in vehicle speed by one stage is to be performed, in a state where the gear stage that is higher in vehicle speed by one stage is formed after the shift control unit determines that a shift to the predetermined gear stage is to be performed.

Besides, as a seventh aspect of the disclosure, in the control apparatus for the automatic transmission according to the first aspect of the disclosure, the shift control unit may make a shift of the automatic transmission decided using the predetermined relationship, when it is determined that the drive requirement amount is equal to or smaller than the predetermined requirement amount.

Besides, as an eighth aspect of the disclosure, the control apparatus for the automatic transmission according to the first aspect of the disclosure may be equipped with a torque control unit that reduces an input torque of the automatic transmission such that an output torque of the automatic transmission becomes equal to an output torque of the automatic transmission at a time when the predetermined, gear stage is formed, in a case where the gear stage that is lower in vehicle speed by one stage is formed when the shift control unit determines that a shift to the predetermined gear stage is to be performed.

According to the first aspect of the disclosure, when the drive requirement amount is larger than the predetermined requirement amount in the case where the shift control unit determines that a shift to the predetermined gear stage at which the maximum load is applied to the predetermined rotary member of the automatic transmission is to be performed, the predetermined gear stage is not formed. Therefore, a large load is restrained from being applied to the predetermined rotary member of the automatic transmission. Besides, the gear stage that is lower in vehicle speed than the predetermined gear stage by one stage or the gear stage that is higher in vehicle speed than the predetermined stage by one stage is formed depending on whether the acceleration requirement is large or small. Therefore, a driving torque corresponding to the acceleration requirement is likely to be obtained. In consequence, the load applied to the predetermined rotary member of the automatic transmission can be reduced, and a feeling of strangeness can be restrained from being caused by a driving torque.

Besides, according to the second aspect of the disclosure, when the drive requirement amount is larger than the predetermined requirement amount in the case where the shift control unit determines that an upshift to the predetermined gear stage is to be performed, the predetermined gear stage is not formed. Therefore, a large load is restrained from being applied to the predetermined rotary member of the automatic transmission. Besides, the gear stage that is lower in vehicle speed by one stage is held, or an upshift to the gear stage that is higher in vehicle speed by one stage is made, depending on whether the acceleration requirement is large or small. Therefore, a driving torque corresponding to the acceleration requirement is likely to be obtained.

Besides, according to the third aspect of the disclosure, when the running state of the vehicle is the predetermined running stage where the drive requirement amount has remained larger than the predetermined requirement amount, the vehicle speed has risen and the predetermined time or less has elapsed since an upshift from the gear stage that is lower in vehicle speed than the predetermined gear stage by two stages to the gear stage that is lower in vehicle speed than the predetermined gear stage by one stage (i.e., a predetermined running state where an upshift from the gear stage that is lower in vehicle speed by two stages to the gear stage that is lower in vehicle speed by one stage and an upshift from the gear stage that is lower in vehicle speed by one stage to the predetermined gear stage are successively made) in the case where the shift control unit determines that an upshift to the predetermined gear stage is to be performed, an upshift to the predetermined gear stage is to be performed. Therefore, the driver is kept from developing a feeling of strangeness due to the making of successive upshifts without forming the predetermined gear stage.

Besides, according to the fourth aspect of the disclosure, when the drive requirement amount is larger than the predetermined requirement amount in the case where a decision on a downshift to the predetermined gear stage is made, the predetermined gear stage is not formed. Therefore, a large load is restrained from being applied to the predetermined rotary member of the automatic transmission. Besides, a downshift to the gear stage that is lower in vehicle speed by one stage is made, or the gear stage that is higher in vehicle speed by one stage is held, depending on whether the acceleration requirement is large or small. Therefore, a driving torque corresponding to the acceleration requirement is likely to be obtained.

Besides, according to the fifth aspect of the disclosure, when the shift control unit determines that a shill to a gear stage other than the predetermined gear stage, namely, the gear stage that is lower in vehicle speed by one stage or the gear stage that is higher in vehicle speed by one stage is to be performed during the control of forming a gear stage other than the predetermined gear stage, namely, the gear stage that is lower in vehicle speed by one stage in the case where the shift control unit determines that a shift to the predetermined gear stage is to be performed, a gear stage matching the decided shift is formed. Therefore, the control of forming a gear stage other than the predetermined gear stage is appropriately ended.

Besides, according to the sixth aspect of the disclosure, when the shift control unit determines that a shift to a gear stage other than the predetermined gear stage, namely, the gear stage that is higher in vehicle speed by one stage or the gear stage that is lower in vehicle speed by one stage is to be performed during the control of forming a gear stage other than the predetermined gear stage, namely, the gear stage that is higher in vehicle speed by one stage in the case where the shift control unit determines that a shift to the predetermined gear stage is to be performed, a gear stage matching the decided shift is formed. Therefore, the control of forming a gear stage other than the predetermined gear stage is appropriately ended.

Besides, according to the seventh aspect of the disclosure, when the drive requirement amount is equal to or smaller than the predetermined requirement amount, the decided shift of the automatic transmission is made. Therefore, in the case where the load applied to the predetermined rotary member of the automatic transmission is small, the control of forming a gear stage other than the predetermined gear stage when the shift control unit determines that a shift to the predetermined gear stage is to be performed is appropriately ended, or this control is not performed. That is, when the load applied to the predetermined rotary member of the automatic transmission does not present any problem, a shift to the predetermined gear stage is possible. When the drive requirement amount is equal to or smaller than the predetermined requirement amount, the driver is kept from developing a feeling of strangeness due to the performance of the control of forming a gear stage other than the predetermined gear stage.

Besides, according to the eighth aspect of the disclosure, when the gear stage that is lower in vehicle speed by one stage is formed in the case where the shift control unit determines that a shift to the predetermined gear stage is to be performed, the input torque of the automatic transmission is reduced so as to become equivalent to the output torque of the automatic transmission at the time when the predetermined gear stage is formed. Therefore, the driver is restrained from developing a feeling of strangeness due to the performance of the control of forming a gear stage other than the predetermined gear stage after the generation of approximately the same driving torque as when a shift to the predetermined gear stage is made.

BRIEF DESCRIPTION OF THE DRAWINGS

Features, advantages, and technical and industrial significance of an exemplary embodiment will be described below with reference to the accompanying drawings, in which like numerals denote like elements, and wherein.

DETAILED DESCRIPTION OF EMBODIMENT

The embodiment of the disclosure will be described hereinafter in detail with reference to the drawings.

Figure 1:
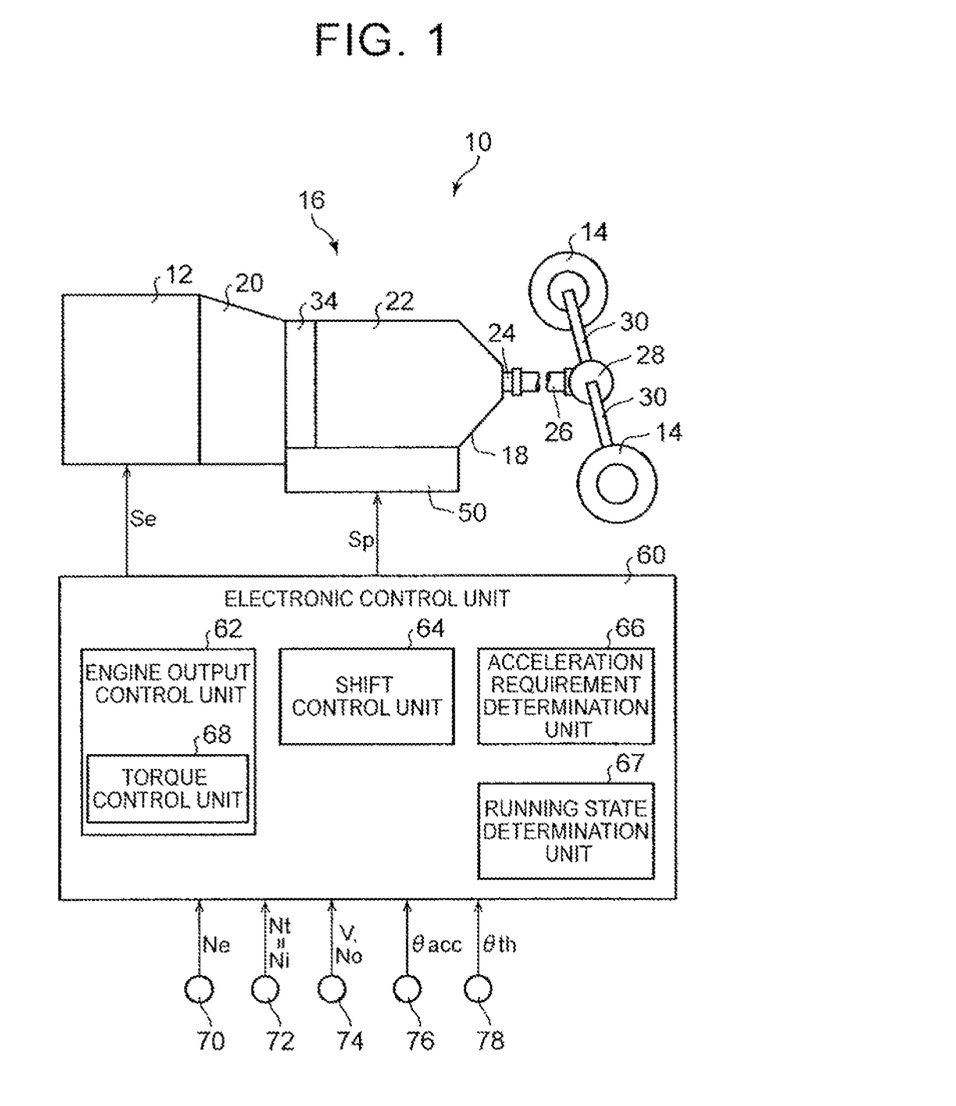
FIG. 1 is a view illustrating the general configuration of a vehicle to which the disclosure is applied and illustrating control functions and the essential part of a control system for various kinds of control in the vehicle.

FIG. 1 is a view illustrating the general configuration of a vehicle 10 to which the disclosure is applied, and illustrating the essential part of a control system for various kinds of control in the vehicle 10. In FIG. 1, the vehicle 10 is equipped with an engine 12, driving wheels 14, and a power transmission device 16 that is provided in a power transmission path between the engine 12 and the driving, wheels 14. The power transmission device 16 is equipped with a torque converter 20 and an automatic transmission 22 that are disposed in a case 18 as a non-rotary member that is attached to a vehicle body, a propeller shaft 26 that is coupled to a transmission output shaft 24 as an output rotary member of the automatic transmission 22, a differential gear mechanism (a differential gear) 28 that is coupled to the propeller shaft 26, a pair of axles 30 that are coupled to the differential near mechanism 28, and the like. In the power transmission device 16, a power output from the engine 12 (which is synonymous with a torque and a force when no distinction is made therebetween in particular) is transmitted to the driving wheels 14 sequentially via the torque converter 20, the automatic transmission 22, the propeller shaft 26, the differential gear mechanism 28, the axles 30 and the like.

The engine 12 is a driving force source of the vehicle 10, and is a known internal combustion engine such as a gasoline engine, a diesel engine or the like. Operating states of this engine 12 such as an intake air amount, a fuel supply amount, an ignition timing and the like are controlled by an electronic control unit 60 that will be described later. Thus, an engine torque Te of the engine 12 is controlled.

Figure 2:
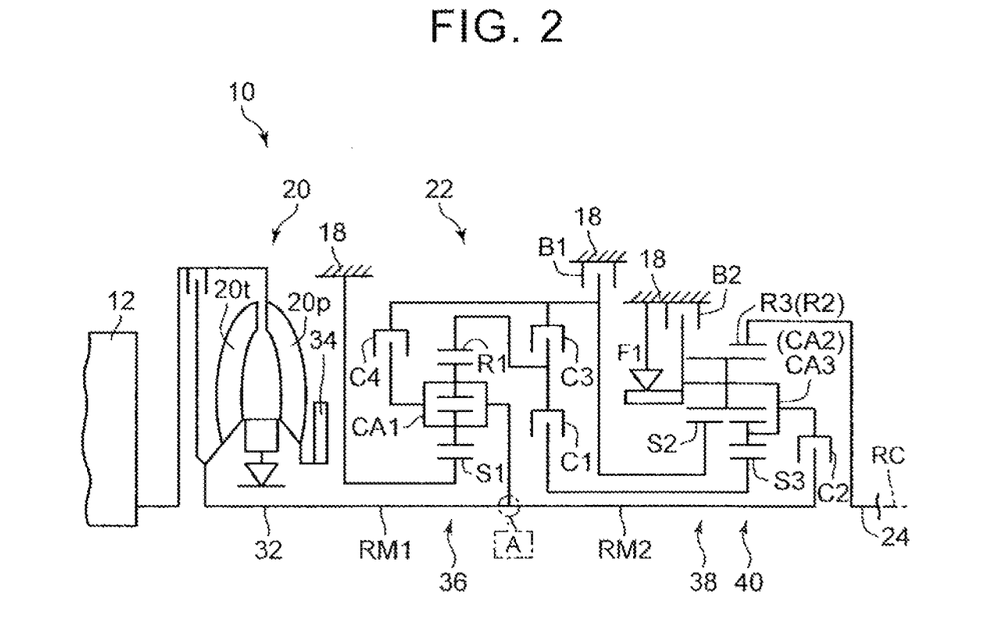
FIG. 2 is a skeleton view illustrating examples of a torque converter and an automatic transmission.

FIG. 2 is a skeleton view illustrating examples of the torque converter 20 and the automatic transmission 22. Incidentally, the torque converter 20, the automatic transmission 22 and the like are substantially symmetrically configured with respect to an axial center RC of a transmission input shaft 32 as an input rotary member of the automatic transmission 22. A lower half located below the axial center RC is omitted in FIG. 2.

In FIG. 2, the torque converter 20 is a fluid transmission device that is disposed in such a manner as to rotate around the axial center RC and that is equipped with as pump impeller 20*p* that is coupled to the engine 12, and a turbine impeller 20*t* that is coupled to the transmission input shaft 32. A mechanical oil pump 34 that is rotationally driven by the engine 12 to generate a working fluid pressure for performing shift control of the automatic transmission 22 and supplying lubricating oil to respective portions of the power transmission path of the power transmission device 16 is coupled to the pump impeller 20*p* (see FIG. 1).

The automatic transmission 22 is a stepped automatic transmission that constitutes part of the power transmission path between the engine 12 and the driving wheels 14. The automatic transmission 22 is a planetary gear-type multi-stage transmission having a plurality of sets of planetary gear units and a plurality of engagement devices. In this planetary gear-type multistage transmission, a plurality of gear stages (shift stages) that are different in a gear ratio (a shift ratio) γ (=an AT input rotational speed Ni/an AT output rotational speed No) from one another are selectively formed through engagement of a predetermined one or ones of the plurality of the engagement devices. The automatic transmission 22 is a stepped transmission that is often employed in a known vehicle to make a so-called clutch-to-clutch shift.

The automatic transmission 22 has a double pinion-type first planetary gear unit 36, a single pinion-type second planetary gear unit 38 that is configured as a Ravigneaux-type planetary gear unit, and a double pinion-type third planetary gear unit 40 that is configured as a Ravigneaux-type planetary gear unit. The first planetary gear unit 36, the second planetary gear unit 38 and the third planetary gear unit 40 are coaxial with one another (on the axial center RC). The automatic transmission 22 shifts the rotation of the transmission input shaft 32, and outputs it from the transmission output shaft 24. In the automatic transmission 22, respective rotary elements of the first planetary gear unit 36, the second planetary gear unit 38 and the third planetary gear unit 40 (sun gears S1, S2 and S3, carriers CA1, CA2 and CA3, and ring gears R1, R2 and R3) are partially coupled to one another or coupled to the transmission input shaft 32, the case 18 or the transmission output shaft 24, either directly or indirectly (or selectively) via the engagement devices.

The plurality of the engagement devices are frictional engagement devices and a one-way clutch F1. The aforementioned frictional engagement devices are clutches C1, C2, C3 and C4 and brakes B1 and B2 (hereinafter referred to simply as frictional engagement devices B and C when no distinction is made therebetween in particular). The frictional engagement devices B and C are hydraulic frictional engagement devices that are constituted of wet multi plate-type clutches and a wet multi plate-type brake that are pressed by hydraulic actuators, a band brake that is tightened by a hydraulic actuator, and the like. The torque capacities (i.e., clutch torques) of the frictional engagement devices B and C are changed respectively by oil pressures from solenoid valves and the like in an oil pressure control circuit 50 (see FIG. 1) with which the automatic transmission 22 is equipped. Thus, a changeover between the engagement of each of the frictional engagement devices B and C and the release thereof is made.

Figure 3:
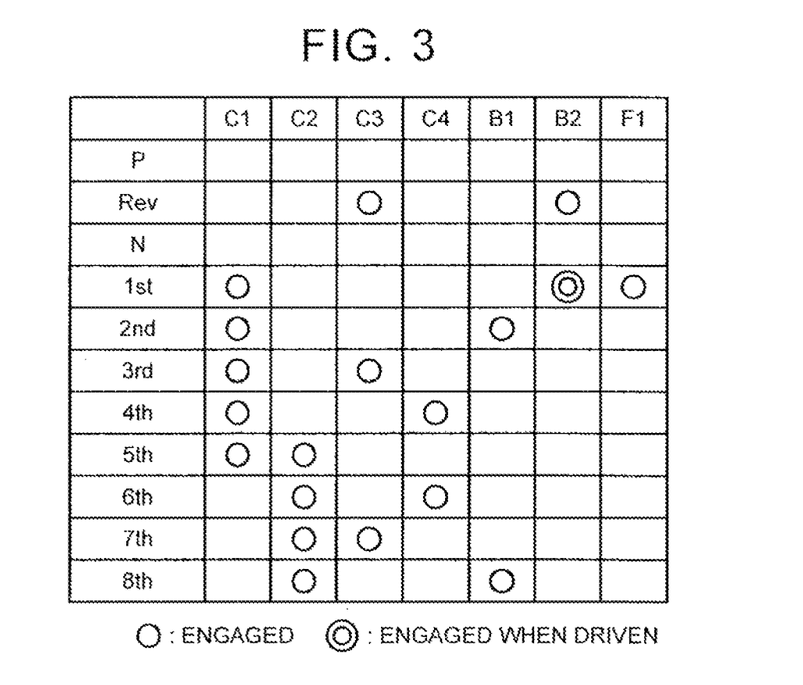
FIG. 3 is an operational chart illustrating a relationship between the shift operation of the automatic transmission and a combination of operations of engagement devices used for the shift operation.

An electronic control unit 60 that will be described later controls the engagement and release of the frictional engagement devices B and C. Thus, as shown in an engagement operational chart of FIG. 3, respective gear stages, namely, 8 forward stages and a backward stage are formed in accordance with an operation of an accelerator by a driver, a vehicle speed V and the like. In FIG. 3, "1st" to "8th" mean first to eighth gear stages as the forward gear stages, "Rev" means the backward gear stage, "N" means a neutral state where none of the gear stages is formed, and "P" means the neutral state where the transmission output shall 24 is mechanically stopped from rotating (locked). The gear ratio γ of the automatic transmission 22 corresponding to each of the gear stages is appropriately determined by respective gear ratios (=the number of teeth of the sun gear/the number of teeth of the ring gear) ρ1, ρ2 and ρ3 of the first planetary year unit 36, the second planetary gear unit 38 and the third planetary gear unit 40.

The engagement operational chart of FIG. 3 summarizes a relationship between the aforementioned respective gear stages and respective operating states of the engagement devices. In FIG. 3, circles represent engagement, a double circle represents engagement in a driven state (at the time of engine brake), and blanks represent release. In the automatic transmission 22, the one-way clutch F1, which prevents the integrally coupled carriers CA2 and CA3 from rotating backward while allowing the carriers CA2 and CA3 to rotate positively (in the same rotational direction as the transmission input shaft 32), is provided in parallel with the brake B2, between the carriers CA2 and CA3 and the case 18. Accordingly, at the time of driving when the driving wheel 14 sides are rotationally driven from the engine 12 side, the first gear stage "1st" is formed through automatic engagement of the one-way clutch F1 even if the brake B2 is not engaged.

Returning to FIG. 1, the vehicle 10 is equipped with the electronic control unit 60 that includes, for example, a control unit for the automatic transmission 22 that is associated with shift control of the automatic transmission 22 and the like. In consequence, FIG. 1 is a view showing input/output systems of the electronic control unit 60, and is a functional block diagram illustrating the essential part of control functions performed by the electronic control unit 60. The electronic control unit 60 is configured to include, for example, a so-called microcomputer in is equipped with a CPU, a RAM, a ROM, an input/output interface and the like. The CPU performs various kinds of control of the vehicle 10 by executing a signal processing in accordance with a program stored in advance in the ROM, while utilizing a temporary storage function of the RAM. For example, the electronic control unit 60 performs output control of the engine 12, shift control of the automatic transmission 22 and the like, and is configured as separate electronic control units, that is, an electronic control unit for engine output control and an electronic control unit for oil pressure control (shift control) or the like if necessary.

The electronic control unit 60 is supplied with various actual values (e.g., an engine rotational speed Ne, the AT input rotational speed Ni as a rotational speed of the transmission input shaft 32 corresponding to a turbine rotational speed Nt, the AT output rotational speed No as a rotational speed of the transmission output shaft 24 corresponding to the vehicle speed V, an accelerator opening degree θacc as an operation amount of an accelerator pedal, a throttle valve opening degree θth as an opening degree of an electronic throttle valve and the like) based on detection signals detected by various sensors with which the vehicle 10 is equipped (e.g., an engine rotational speed sensor 70, an input rotational speed sensor 72, an output rotational speed sensor 74, an accelerator opening degree sensor 76, a throttle valve opening degree sensor 78 and the like). Besides, an engine output control command signal Se for output control of the engine 12, an oil pressure control command signal Sp for oil pressure control related to the shift of the automatic transmission 22 and the like are output from the electronic control unit 60. This oil pressure control command signal Sp is a command signal (an oil pressure command value) for driving the respective solenoid valves that regulate the respective oil pressures supplied, to the respective hydraulic actuators of the frictional engagement devices B and C, and is output to the oil pressure control circuit 50.

The electronic control unit 60 is equipped with engine output control means, namely, an engine output control unit 62, and shift control means, namely, a shift control unit 64.

The engine output control unit 62 calculates a required driving force Fdem by applying the accelerator opening degree θacc and the vehicle speed V to a relationship that is obtained in advance experimentally or through designing and stored (i.e., determined in advance) (e.g., a driving force map). In consideration of a transmission loss, an auxiliary load, the gear ratio γ of the automatic transmission 22 and the like, the engine output control unit 62 outputs the engine output control command signal Se for perform output control of the engine 12 to a throttle actuator, a fuel injection device, an ignition device and the like such that the required driving force Fdem is obtained.

The shift control unit 64 makes a decision on a shift of the automatic transmission 22 by determining whether or not changeover control of the gear stages of the automatic transmission 22 is performed, using a relationship determined in advance (a shift map or a shift diagram). The shift control unit 64 makes a decision on a shift of the automatic transmission 22 (i.e., makes a decision on a gear stage to be formed in the automatic transmission 22) by applying a vehicle speed-associated value and the drive requirement amount to the aforementioned shift map. The shift control unit 64 outputs the oil pressure control command signal Sp for engaging and/or releasing the frictional engagement devices B and C related to the shift of the automatic transmission 22 to the oil pressure control circuit 50, such that the decided gear stage is formed. The aforementioned vehicle speed-associated value is the vehicle speed V or a value associated with the vehicle speed V, and is, for example, the vehicle speed V, a wheel speed, the AT output rotational speed No or the like. The aforementioned drive requirement amount is a value representing the magnitude of a drive requirement made of the vehicle 10 by the driver, and is, for example, the above-mentioned required driving force Fdem (N), a required driving torque (Nm) or required driving power (W) associated with the required driving force Fdem, or the like. The accelerator opening degree θacc (%), the throttle valve opening degree θth (%), the amount of intake air (g/sec) or the like can also be used simply as this drive requirement amount.

Figure 4:
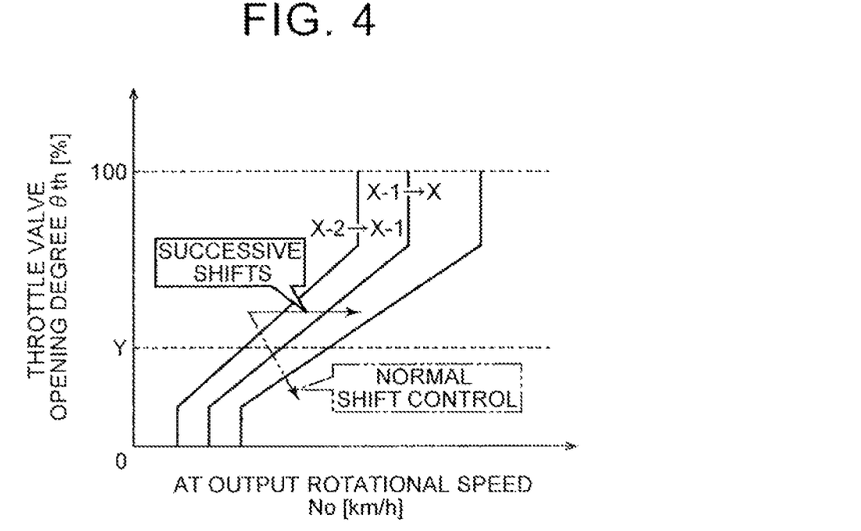
FIG. 4 is a view for illustrating, on a shift map, a shift mode in which successive shifts are made.

The aforementioned shift map is a predetermined relationship having shift lines for making a decision on a shift of the automatic transmission 22 on a two-dimensional coordinate system in which, for example, the AT output rotational speed No as a vehicle speed-associated value and the throttle valve opening degree θth as a drive requirement amount are used as variables (see FIGS. 4 and 5 that will be described later, and the like). The respective shift lines in this shift map are upshift lines (see solid lines in FIGS. 4 and 5) for making a decision on an upshift and a downshift line (see a broken line in FIG. 5) for making a decision on a downshift. Each of these shift lines is designed to determine whether or not the actual AT output rotational speed No has crossed a line indicating a certain value of the throttle valve opening degree θth or whether or not the actual throttle valve opening degree θth has crossed a line indicating a certain value of the AT output rotational speed No, namely, whether or not a value at which a shill should be made on the shift line (a shift point) has been passed, and is determined in advance as a series of such shift points.

By the way, in a more multi-staged automatic transmission such as the automatic transmission 22, the torque transmitted to a specific rotary member at a specific gear stage is made larger than an input torque Ti of the automatic transmission 22 (i.e., a turbine torque Tt as an output torque of the torque converter 20), and the load applied to the specific rotary member becomes large in some cases. In view of the fact that the physical constitution of the automatic transmission 22 is limited due to a prerequisite for mounting the automatic transmission 22 in the vehicle 10 and that the size of the specific rotary member is limited due to restrictions on the space in the case 18, the load applied to the specific rotary member is desired to be reduced through control. If the engine torque Te is limited at the specific gear stage, the load applied to the specific rotary member can be reduced. However, the driving torque may not reach the required driving torque at the specific gear stage, and the acceleration performance may deteriorate. Also, the driving torque may become discontinuous upon a shift to the specific gear stage, and the driver may develop a feeling of strangeness. Therefore, in the present embodiment of the disclosure, the load applied to the specific rotary member is reduced by appropriately lowering the frequency of use of the specific gear stage.

Referring to FIG. 2, the transmission input shaft 32 has a first rotary portion RM1 that is located, on the torque converter 20 side with respect to a branch point A, and a second rotary portion RM2 that is located on the clutch C2 side with respect to the branch point A. The turbine torque Tt is transmitted to the first rotary portion RM1. An amplified torque obtained by multiplying the turbine torque Tt by a predetermined number is input to the second rotary portion RM2 as a load. This predetermined number differs depending on the gear stage. In the case where there is a gear stage with this predetermined number larger than 1, the load applied to the second rotary portion RM2 presents a problem depending on the magnitude of the predetermined number. As long as the flow of torque branches off at the branch point A, such a problem makes no difference whether the first rotary portion RM1 and the second rotary portion RM2 are configured as a single member or two members that are coupled to each other. It is preferable that the second rotary portion RM2 be designed with the same diameter as the first rotary portion RM1. Therefore, the load applied to the second rotary portion RM2 is especially desired to be reduced by appropriately lowering the frequency of use of the specific gear stage. The aforementioned specific gear stage is a predetermined gear stage at which a maximum load is applied to the predetermined rotary member of the automatic transmission 22. Besides, this predetermined rotary member is, for example, the second rotary portion RM2.

The appropriate lowering of the frequency of use of the predetermined gear stage will be reviewed. Even in the case where the predetermined gear stage used, when the turbine torque Tt is small (i.e., when the engine torque Te is small), the torque transmitted to the second rotary portion RM2 is small. Accordingly, when the drive requirement amount at which the engine torque Te becomes small is small in the case where a decision on a shift to the predetermined gear stage is made using the shift map determined in advance, normal shift control for forming the decided predetermined gear stage is performed. On the other hand, when the drive requirement amount at which the engine torque Te becomes large is large in the case where a decision on a shift to the predetermined gear stage is made using the shift map determined in advance, shift control at the time of limitation when the decided predetermined gear stage is not formed is performed. When the drive requirement amount is large, the acceleration requirement may be large or small. When the acceleration requirement is large, the driving torque is made to satisfy the required driving torque by forming a gear stage that is lower in vehicle speed (lower) than the predetermined gear stage by one stage. In this case, when the engine torque Te equivalent to the predetermined gear stage is generated, the driving torque may become too large. Therefore, when the gear stage that is lower in vehicle speed (lower) by one stage is formed, the engine torque Te is reduced such that the same driving torque as when the engine torque Te equivalent to the predetermined gear stage is generated is obtained. On the contrary, when the acceleration requirement is small, the development of a feeling of strangeness is considered to be unlikely even in the case of a deterioration in the acceleration performance. Therefore, a gear stage that is higher in vehicle speed (higher) than the predetermined gear stage by one stage is formed.

Shift modes that are changed over based on the type of a shift and the magnitude of air acceleration requirement when a decision on a shift to the gear stage (X) as the predetermined gear stage is made will be described. When the throttle valve opening degree θth is larger than a predetermined throttle valve opening degree Y as a predetermined requirement amount and the acceleration requirement is large in the case where a decision on an upshift from a gear stage (X−1) that is lower in vehicle speed than the gear stage (X) by one stage to the gear stage (X) is made, the gear stage (X−1) is held. When the throttle valve opening degree θth is larger than the predetermined throttle valve opening degree Y and the acceleration requirement is small in the case where a decision on an upshift from the gear stage (X−1) to the gear stage (X) is made, a skip shift from the gear stage (X−1) to the gear stage (X+1) that is higher in vehicle speed than the gear stage (X) by one stage is made. When the throttle valve opening degree θth is larger than the predetermined throttle valve opening degree Y and the acceleration requirement is large in the case where a decision on a downshift from the gear stage (X+1) to the gear stage (X) is made, a skip shift from the gear stage (X+1) to the gear stage (X−1) is made. When the throttle valve opening degree θth is larger than the predetermined throttle valve opening degree Y and the acceleration requirement is small in the case were a decision on a downshift front the gear stage (X+1) to the gear stage (X) is made, the gear stage (X+1) is held.

The predetermined requirement amount (e.g., the predetermined throttle valve opening degree Y) is an upper limit of the drive requirement amount the throttle valve opening degree θth) that is determined in advance to obtain the input torque Ti (which is synonymous with the engine torque Te in this case) at which the load applied to the predetermined rotary member (e.g., the second rotary portion RM2) is unlikely to present a problem even when the predetermined gear stage (e.g., the gear stage (X)) is used. It is determined whether the acceleration requirement is large or small, based on whether a change in the drive requirement amount (e.g., a change rate dθth/dt of the throttle valve opening degree θth (hereinafter referred to as a throttle change rate θth')) is larger or smaller than a predetermined change rate Z as a change in the predetermined requirement amount. The change in the predetermined requirement amount (e.g., the predetermined change rate Z) is as determination threshold that is determined in advance to determine that the acceleration requirement is large, and is, for example, a positive value equal to or larger than zero.

It should be noted herein that when an upshift from the gear stage (X−1) to the gear stage (X) follows an upshift from a gear stage (X−2) that is lower in vehicle speed than the gear stage (X) by two stages to the gear stage (X−1), normal shift control for forming the decided gear stage (X) is desired to be performed to ensure that the driver does not develop a feeling of strangeness. FIG. 4 is a view for illustrating, on a shift map, a shift mode in which successive shifts are made. In FIG. 4, a shift gear is shifted to the gear stage (X) when the vehicle is in a predetermined running state that is determined in advance to determine that successive shifts are made in the case where a decision on an upshift from the gear stage (X−1) to the gear stage (X) is made. Incidentally, as shown in FIG. 4, when the throttle valve opening degree θth is equal to or smaller than the predetermined throttle valve opening degree Y, normal shift control is performed.

Figure 5:
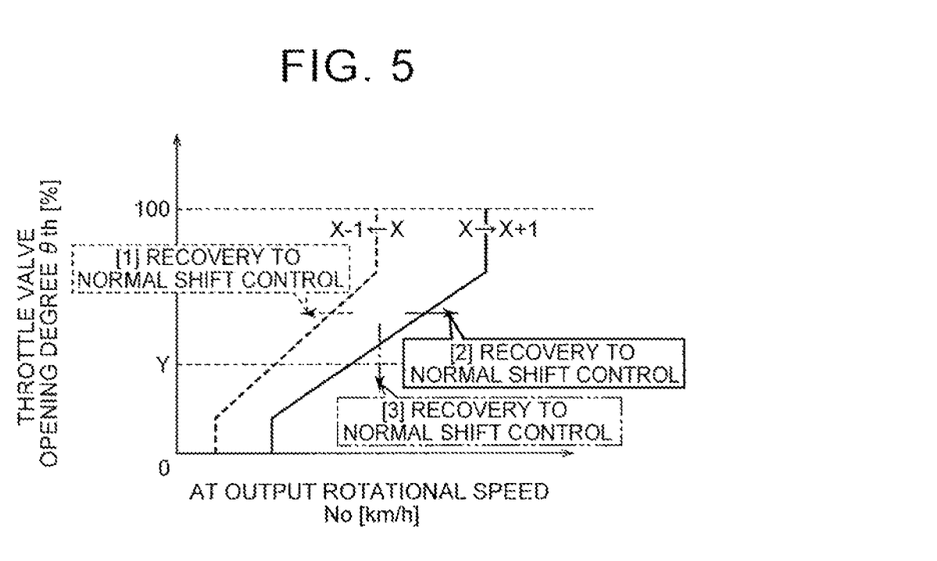
FIG. 5 is a view for illustrating, on a shift map, a shift mode for making a recovery from shift control at the time of limitation when a decided gear stage (X) is not formed to normal shift control.

FIG. 5 is a view for illustrating, on a shift map, a shift mode in which a recovery from shift control at the time of limitation when the decided gear stage (X) is not formed to normal shift control is made. In FIG. 5, when the shift control unit 64 determines that a downshift from the gear stage (X) to the gear stage (X−1) is to be performed (see a state [1] in the drawing) during shift control at the time of limitation when the gear stage (X−1) is formed (i.e., in a state where the gear stage (X−1) is actually formed although the gear stage (X) is formed in the case of normal shill control after the shift control unit 64 determines that a shift to the gear stage (X) is to be performed), the gear stage (X−1) is held, and shift control at the time of limitation is ended. On the other hand, when the shift control unit 64 determines that an upshift from the gear stage (X) to the gear stage (X+1) is to be performed (see a state [2] in the drawing), a skip shift from the gear stage (X−1) to the gear stage (X+1) is made, and shift control at the time of limitation is ended. When the shift control unit 64 determines that an upshift from the gear stage (X) to the gear stage (X+1) is to be performed (see the state [2] in the drawing) during shift control at the time of limitation when the gear stage (X+1) is formed (i.e., in a state where the gear stage (X+1) is actually formed although the gear stage (X) is formed in the case of normal shift control after the shift control unit 64 determines that a shift to the gear stage (X) is to be performed), the gear stage (X+1) is held, and shift control at the time of limitation is ended. On the other hand, when the shift control unit 64 determines that a downshift from the gear stage (X) to the gear stage (X−1) is to be performed (see the state [1] in the drawing), a skip shift from the gear stage (X+1) to the gear stage (X−1) is made, and shift control at the time of limitation is ended. Alternatively, when the throttle valve opening degree θth becomes equal to or smaller than the predetermined throttle valve opening degree Y (see a state [3] in the drawing), shift control at the time of limitation is ended.

In order to realize the shift mode described above, concretely, the electronic control unit 60 is further equipped with an acceleration requirement determination unit 66, and a running state determination unit 67.

The acceleration requirement determination unit 66 determines whether or not the throttle valve opening degree θth is larger than the predetermined throttle valve opening degree Y. If it is determined that the throttle valve opening degree θth is larger than the predetermined throttle valve opening degree Y, the acceleration requirement determination unit 66 determines whether the acceleration requirement is large or small, based on whether the throttle change rate θth' is larger or smaller than the predetermined change rate Z. If the throttle change rate θth is equal to or larger than the predetermined change rate Z, the acceleration requirement determination unit 66 determines that the acceleration requirement is large. If the throttle change rate θth' is smaller than the predetermined change rate Z, the acceleration requirement determination unit 66 determines that the acceleration requirement is small.

The running state determination unit 67 determines whether or not the running state of the vehicle 10 is a predetermined running state where the acceleration requirement determination unit 66 has continued to determine that the throttle valve opening degree θth is larger than the predetermined throttle valve opening degree Y, the vehicle speed V has risen and a predetermined time or less has elapsed since an upshift from the gear stage (X−2) to the gear stage (X−1). The running state determination unit 67 determines whether or not successive shifts are made, by determining whether or not the running state of the vehicle 10 is the predetermined running state when the shift control unit 64 determines that the gear stage (X−1) is to be upshifted to the gear stage (X). The aforementioned predetermined time is a determination threshold that is determined in advance to make it possible to determine that successive shifts are performed.

If the acceleration requirement determination unit 66 determines that the throttle valve opening degree θth is larger than the predetermined throttle valve opening degree Y and that the acceleration requirement is large in the case where the shift control unit 64 determines that a shift to the gear stage (X) is to be performed, the shift control unit 64 performs shift control at the time of limitation to output the oil pressure control command signal Sp for forming the gear stage (X−1) to the oil pressure control circuit 50. In the case where the shift control unit 64 determines that a shift to the gear stage (X) is to be performed, if the acceleration requirement determination unit 66 determines that the throttle valve opening degree θth is larger than the predetermined throttle valve opening degree Y and that the acceleration requirement is small, the shift control unit 64 performs shift control at the time of limitation to output the oil pressure control command signal Sp for forming the gear stage (X+1) to the oil pressure control circuit 50.

If the acceleration requirement determination unit 66 determines that the acceleration requirement is large in the case where the shift control unit 64 determines that an upshift from the gear stage (X−1) to the gear stage (X) is to be performed, the shift control unit 64 holds the gear stage (X−1). In the case where the shift control unit 64 determines that an upshift from the gear stage (X−1) to the gear stage (X) is to be performed, if the acceleration requirement determination unit 66 determines that the acceleration requirement is small, the shift control unit 64 makes an upshift from the gear stage (X−1) to the gear stage (X+1).

If the acceleration requirement determination unit 66 determines that the throttle valve opening degree θth is larger than the predetermined throttle valve opening degree Y and if the miming state determination unit 67 determines that the running state of the vehicle 10 is the predetermined running state (i.e., that successive shifts are made) in the case where the shift control unit 64 determines that an upshift from the gear stage (X−1) to the gear stage (X) is to be performed, the shift control unit 64 makes an upshift to the gear stage (X). That is, even when the throttle vase opening degree θth is larger than the predetermined throttle valve opening degree Y in the case where the shift control unit 64 determines that an upshift to the gear stage (X) is to be performed, the shift control unit 64 makes an upshift to the gear stage (X) as long as successive shifts are made.

If the acceleration requirement determination unit 66 determines that the acceleration requirement is large in the case where the shift control unit 64 determines that a downshift from the gear stage (X+1) to the gear stage (X) is to be performed, the shift control unit 64 makes a downshift from the gear stage (X+1) to the gear stage (X−1). If the acceleration requirement determination unit 66 determines that the acceleration requirement is small in the case where the shift control unit 64 determines that a downshift from the gear stage (X+1) to the gear stage (X) is to be performed, the shift control unit 64 holds the gear stage (X+1).

When the shift control unit 64 determines that a shift from the gear stage (X) to the gear stage (X−1) is to be performed during shift control at the time of limitation when the gear stage (X−1) is formed, the shift control unit 64 holds the gear stage (X−1), ante ends shift control at the time of limitation. On the other band, when the shift control unit 64 determines that a shift from the gear stage (X) to the gear stage (X+1) is to be performed during shift control at the time of limitation when the gear stage (X−1) is formed, the shift control unit 64 makes an upshift from the gear stage (X−1) to the gear stage (X+1), and ends shift control at the time of limitation. The end of shift control at the time of limitation means a recovery to normal shill control.

When the shift control unit 64 determines that a shift from the gear stage (X) to the gear stage (X+1) is to be performed during shift control at the time of limitation when the gear stage (X+1) is formed, the shift control unit 64 holds the gear stage (X×1), and ends shift control at the time of limitation. On the other hand, when the shift control unit 64 determines that a shift from the gear stage (X) to the gear stage (X−1) is be performed during shift control at the time of limitation when the gear stage (X+1) is formed, the shift control unit 64 makes a downshift from the gear stage (X+1) to the gear stage (X−1) and ends shift control at the time of limitation.

If the acceleration requirement determination unit 66 determines that the throttle valve opening degree θth is equal to or smaller than the predetermined throttle valve opening degree Y, the shift control unit 64 performs normal shift control for making a shift of the automatic transmission 22 decided using the shift map. In concrete terms, if the acceleration requirement determination unit 66 determines that the throttle valve opening degree θth is equal to or smaller than the predetermined throttle valve opening degree Y in the case where the shill control unit 64 determines that a shift to the gear stage (X) is to be performed, the shift control unit 64 makes a shift to the mar stage (X). If the acceleration requirement determination unit 66 determines that the throttle valve opening degree θth is equal to or smaller than the predetermined throttle valve opening degree Y during shift control at the time of limitation, the shift control unit 64 ends shift control at the time of limitation.

The engine output control unit 62 is endowed with a function as a torque control unit 68 that reduces the input torque Ti of the automatic transmission 22 such that the output torque To of the automatic transmission 22 becomes equal to the output torque To at the time when the gear stage (X) is formed, when the gear stage (X−1) is formed in the case where the shift control unit 64 determines that a shift to the gear stage (X) is to be performed. The torque control unit 68 outputs the engine output control command signal Se for reducing the engine torque Te such that the output torque To becomes equal to the output torque To at the time when the engine torque Te is generated on the assumption that the gear stage (X) is formed, to the throttle actuator and the like, during shift control at the time of limitation when the gear stage (X−1) is formed.

Figure 6:
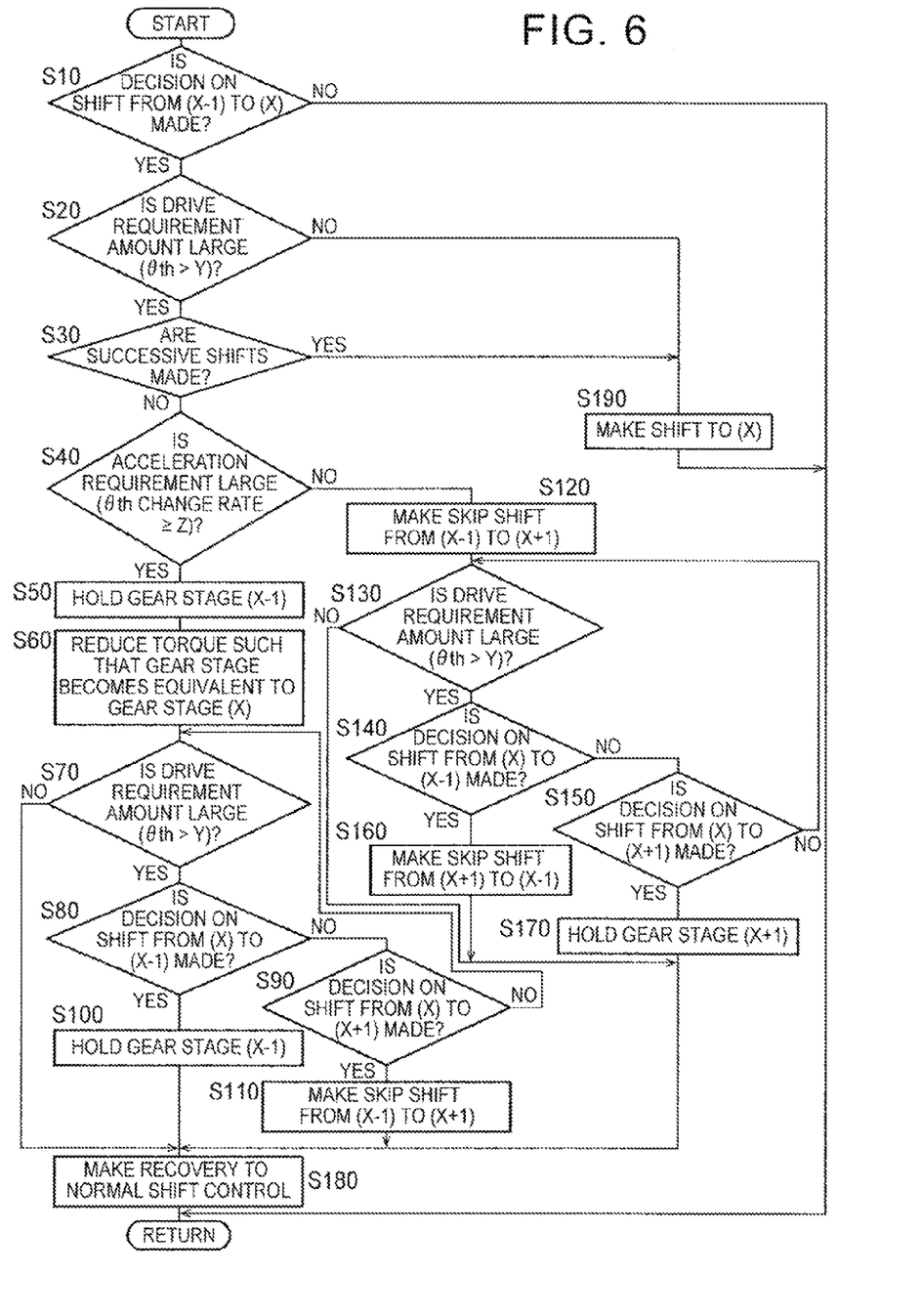
FIG. 6 is a flowchart illustrating the essential part of a control operation of an electronic control unit, namely, a control operation for reducing the load applied to a predetermined rotary member of the automatic transmission and restraining a feeling of strangeness from being caused by a driving torque, and representing a mode of implementation at the time when a decision on an upshift to the gear stage (X) is made.

FIG. 6 is a flowchart illustrating the essential part of a control operation of the electronic control unit 60, namely, a control operation for reducing the load applied to the predetermined rotary member (e.g., the second rotary portion RM2) of the automatic transmission 22 and restraining a feeling of strangeness from being caused by a driving torque. For example, this flowchart is repeatedly executed during the running of the vehicle 10. The flowchart of FIG. 6 is a mode of implementation at the time when the shift control unit 64 determines that an upshift to the gear stage (X) is to be performed.

In FIG. 6, it is first determined, in step (the word "step" will be omitted hereinafter) S10 corresponding to the function of the shift control unit 64, whether or not the shift control unit 64 has determined that the gear stage (X−1) is to be upshifted to the gear stage (X). If the result of the determination in this S10 is negative, the present routine is ended. If the result of the determination in this S10 is positive, it is determined in S20 corresponding to the function of the acceleration requirement determination unit 66 whether or not the drive requirement amount is larger than the predetermined requirement amount (e.g., whether or not the throttle valve opening degree θth is larger than the predetermined throttle valve opening degree Y). If the result of the determination in this S20 is positive, it is determined in S30 corresponding to the function of the running state determination unit 67 whether or not successive shifts are made. If the result of the determination in this S30 is negative, it is determined in S40 corresponding to the function of the acceleration requirement determination unit 66 whether or not the acceleration requirement is large (i.e., whether or not the throttle change rate θth' is equal to or larger than the predetermined change rate Z). If the result of the determination in this S40 is positive, the gear stage (X−1) is held in S50 corresponding to the function of the shift control unit 64. Subsequently, the engine torque Te is subjected to torque-down control so as to become equivalent to the engine torque at the time when the gear stage (X) is formed, in S60 corresponding to the function of the torque control unit 68. Subsequently, it is determined in S70 corresponding to the function of the acceleration requirement determination unit 66 whether or not the drive requirement amount is larger than the predetermined requirement amount (e.g., whether or not the throttle valve opening degree θth is larger than the predetermined throttle valve opening degree Y). If the result of the determination in this S70 is positive, it is determined in S80 corresponding to the function of the shift control unit 64 whether or not the shirt control unit 64 has determined that a downshift from the gear stage (X) to the gear stage (X−1) has been made. If the result of the determination in this S80 is negative, it is determined in S90 corresponding to the function of the shift control unit 64 whether or not an upshift from the gear stage (X) to the gear stage (X+1) has been made. If the result of the determination in this S90 is negative, a return to the aforementioned S70 is made. If the result of the determination in the aforementioned S80 is positive, the gear stage (X−1) is held in S100 corresponding to the function of the shift control unit 64. If the result of the determination in the aforementioned 390 is positive, a skip shift from the gear stage (X−1) to the gear stage (X+1) is made in S110 corresponding to the function of the shift control unit 64. If the result of the determination in the aforementioned S40 is negative, a skip shift from the gear stage (X−1) to the gear stage (X+1) is made in S120 corresponding to the function of the shift control unit 64. Subsequently, it is determined in S130 corresponding to the function of the acceleration requirement determination unit 66 whether or not the drive requirement amount is larger than the predetermined requirement amount (e.g., whether or not the throttle valve opening degree θth is larger than the predetermined throttle valve opening degree Y). If the result of the determination in this S130 is positive, it is determined in S140 corresponding to the function of the shift control unit 64 whether or not a decision on a downshift from the gear stage (X) to the gear stage (X−1) has been made. If the result of the determination in this S140 is negative, it is determined in S150 corresponding to the function of the shift control unit 64 whether or not the shift control unit 64 has determined that the gear stage (X) is to be upshifted to the gear stage (X+1). If the result of the determination in this S150 is negative, a return to the aforementioned S130 is made. If the result of the determination in the aforementioned S140 is positive, a skip shift from the gear stage (X+1) to the gear stage (X−1) is made in S160 corresponding to the function of the shift control unit 64. If the result of the determination in the aforementioned S150 is positive, the gear stage (X+1) is held in S170 corresponding to the function of the shift control unit 64. If the result of the determination in the aforementioned S70 is negative, or subsequently to the aforementioned S100, or subsequently to the aforementioned S110, or if the result of the determination in the aforementioned S130 is negative, or subsequently to the aforementioned S160, or subsequently to the aforementioned S170, shift control at the time of limitation is ended and a recovery to normal shift control is made in S180 corresponding to the function of the shift control unit 64. If the result of the determination in the aforementioned S20 is negative, or if the result of the determination in the aforementioned S30 is positive, a shift to the gear stage (X) is made in S190 corresponding to the function of the shift control unit 64.

Figure 7:
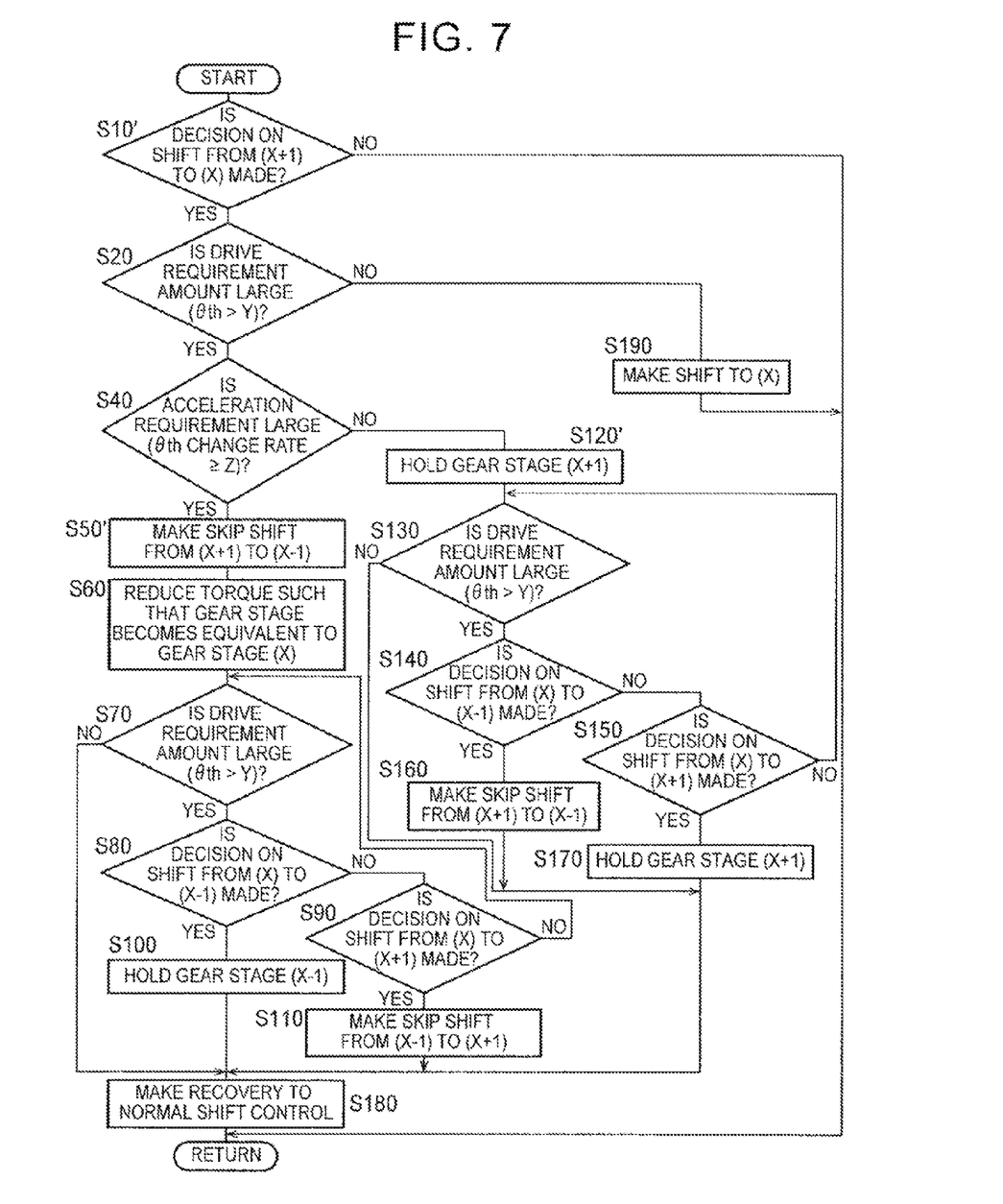
FIG. 7 is a flowchart illustrating the essential part of the control operation of the electronic control unit, namely, the control operation for reducing the load applied, to the predetermined rotary member of the automatic transmission and restraining a feeling of strangeness from being caused by a timing torque, and representing a mode of implementation at the time when a decision on a downshift to the gear stage (X) is made.

FIG. 7 is a flowchart illustrating the essential part of a control operation of the electronic control unit 60, namely, a control operation for reducing the load applied to the predetermined rotary member (e.g., the second rotary portion RM2) of the automatic transmission 22 and restraining a feeling of strangeness from being caused by a driving torque. For example, this flowchart is repeatedly executed during the running of the vehicle 10. The flowchart of FIG. 7 is a mode of implementation at the time when the shift control unit 64 determines that a downshift to the gear stage (X) is to be performed. The flowchart of FIG. 7 is different from the flowchart of FIG. 6 in the control operation of S10, S50 and S120 of FIG. 6. Besides, the flowchart of FIG. 7 is different from the flowchart of FIG. 6 mainly in that S30 of FIG. 6 is dispensed with. The differences will be mainly described.

In FIG. 7, it is first determined in S10 corresponding to the function of the shift control unit 64 whether or not the shift control unit 64 has determined that the gear stage (X+1) is to be downshifted to the gear stage (X). If the result of the determination in this S10' is negative, the present routine is ended. If the result of the determination in this S10' is positive, the foregoing S20 is executed. If the result of the determination in this S20 is positive, the foregoing S40 is executed. If the result of the determination in this S40 is positive a skip shift from the gear stage (X+1) to the gear stage (X−1) is made in S50' corresponding to the function of the shift control unit 64. Subsequently, the foregoing S60 to S110 are executed. If the result of the determination in the aforementioned S40 is negative, the gear stage (X+1) is held in S120' corresponding to the function of the shift control unit 64. Subsequently, the foregoing S130 to S180 are executed. If the result of the determination in the aforementioned S20 is negative, the foregoing S190 is executed.

As described above, according to the present embodiment of the disclosure, when the throttle valve opening degree θth is larger than the predetermined throttle valve opening degree Y in the case where the shift control unit 64 determines that a shift to the gear stage (X) at which a maximum load is applied to the predetermined rotary member (e.g., the second rotary portion RM2) of the automatic transmission 22 is to be performed, the gear stage (X) is not formed. Therefore, a large load is restrained from being applied to the predetermined rotary member of the automatic transmission 22. Besides, the gear stage (X−1) that is lower in vehicle speed than the gear stage (X) by one stage or the gear stage (X+1) that is higher in vehicle speed than the gear stage (X) by one stage is formed, depending on whether the acceleration requirement is large or small. Therefore, a driving torque corresponding to the acceleration requirement is likely to be obtained. In consequence, the load applied to the predetermined rotary member of the automatic transmission 22 can be reduced, and a feeling of strangeness can be restrained from being caused by a driving torque.

Besides, according to the present embodiment of the disclosure, when the throttle valve opening degree θth is larger than the predetermined throttle valve opening degree Y in the case where the shift control unit 64 determines that an upshift to the gear stage (X) is to be performed, the gear stage (X) is not formed. Therefore, a large load is restrained from being applied to the predetermined rotary member of the automatic transmission 22. Besides, the gear stage (X−1) is held, or an upshift to the gear stage (X+1) is made, depending on whether the acceleration requirement is large or small. Therefore, a driving torque corresponding to the acceleration requirement is likely to be obtained.

Besides, according to the present embodiment of the disclosure, when the running state of the vehicle 10 is the predetermined running state where the throttle valve opening degree θth has remained, larger than the predetermined throttle valve opening degree Y, vehicle speed V has risen and the predetermined time or less has elapsed since an upshift from the gear stage (X−2) to the gear stage (X−1) (i.e., the predetermined running state where an upshift from the gear stage (X−2) that is lower in vehicle speed by two stages to the gear stage (X−1) and an upshift from the gear stage (X−1) to the gear stage (X) are successively made) in the case where the shift control unit 64 determines that an upshift to the gear stage (X) is to be performed, an upshift to the gear stage (X) is made. Therefore, the driver is kept from developing a feeling of strangeness due to a failure to make successive upshifts with the gear stage (X) not formed.

Besides, according to the present embodiment of the disclosure, when the throttle valve opening degree θth is larger than the predetermined throttle valve opening degree Y in the case where the shift control unit 64 determines that a downshift to the gear stage (X) is to be performed, the gear stage (X) is not formed. Therefore, a large load is restrained from being applied to the predetermined rotary member of the automatic transmission 22. Besides, a downshift to the gear stage (X−1) is made, or the gear stage (X+1) is held, depending on whether the acceleration requirement is large or small. Therefore, a driving torque corresponding to the acceleration requirement is likely to be obtained.

Besides, according to the present embodiment of the disclosure, when the shift control unit 64 determines that a shift to the gear stage (X−1) or the gear stage (X+1) is to be performed during shift control at the time of limitation when a gear stage other than the gear stage (X), namely, the gear stage (X−1) is formed in the case where a decision on a shift to the gear stage (X) is made, a gear stage matching the decided shift is formed. Therefore, shift control at the time of limitation is appropriately ended.

Besides, according to the present embodiment of the disclosure, when a decision on a shift to the gear stage (X+1) or the gear stage (X−1) is made during shift control at the time of limitation when a gear stage other than the gear stage (X), namely, the gear stage (X+1) is formed in the case where a decision cm a shift to the gear stage (X) is made, a gear stage matching the decided shift is formed. Therefore, shift control at the time of limitation is appropriately ended.

Besides, according to the present embodiment of the disclosure, when the throttle valve opening degree θth is equal to or smaller than the predetermined throttle valve opening degree Y, the decided shift of the automatic transmission 22 is made. Therefore, when the load applied to the predetermined rotary member of the automatic transmission 22 is small, shift control at the time of limitation is appropriately ended, or the control is not performed. That is, when the load applied to the predetermined rotary member of the automatic transmission 22 does not present any problem, a shift to the gear stage (X) is possible. When the throttle valve opening degree θth is equal to or smaller than the predetermined throttle valve opening degree Y, the driver is kept from developing a feeling of strangeness due to the performance of shirt control at the time of limitation.

Besides, according to the present embodiment of the disclosure, when the gear stage (X−1) is formed in the case where the shift control unit 64 determines that a shift to the gear stage (X) is to be performed, the input torque Ti of the automatic transmission 22 is reduced so as to become equivalent to the output torque To of the automatic transmission 22 at the time when the gear stage (X) is formed. Therefore, the driver is restrained from developing a feeling of strangeness due to the performance of shift control at the time of limitation in response to the generation of approximately the same driving torque as when a shift to the gear stage (X) is made.

Although the embodiment of the disclosure has been described above in detail based on the drawings, the disclosure is applicable in other aspects thereof.

For example, in the foregoing embodiment of the disclosure, the second rotary portion RM2 is exemplified as the predetermined rotary member of the automatic transmission 22, but the disclosure is not limited to this aspect thereof. The predetermined rotary member may be any rotary member of the automatic transmission 22 to which a torque obtained by multiplying the turbine torque Tt by a predetermined number (>1) is transmitted at a predetermined gear stage.

Besides, in the foregoing embodiment of the disclosure, the engine torque Te is subjected to torque-down control so as to become equivalent to the torque at the time when the gear stage (X) is formed in S60 in each of the flowcharts of FIGS. 6 and 7. However, this S60 is not absolutely required to be executed. That is, S60 may not be provided in each of the flowcharts of FIGS. 6 and 7. In this manner, each of the flowcharts of FIGS. 6 and 7 can be appropriately changed.

Besides, in the foregoing embodiment of the disclosure, the shift control unit 64 determines that a shift of the automatic transmission 22 is to be performed using the shift map, but the disclosure is not limited to this aspect thereof. For example, the shift control unit 64 determines that a shift of the automatic transmission 22 may be performed using a relationship that is determined in advance to make a decision on the gear stage to be formed in the automatic transmission 22, in consideration of the efficiency of the engine 12, whether the acceleration requirement is large or small, or the like, among the gear stages of the automatic transmission 22 that make it possible to satisfy the required driving force Fdem.

Besides, in the foregoing embodiment of the disclosure, the respective gear stages corresponding to the 8 forward stages are formed the automatic transmission 22, but the disclosure is not limited to this aspect thereof. Besides, the backward gear stage is formed through engagement of the clutch C3 and the brake B2 in the automatic transmission 22, but the backward gear stage can also be formed through, for example, engagement of the clutch C4 and the brake B2. Besides, the first gear stage "1st" is formed through automatic engagement of the one-way clutch F1 in the automatic transmission 22. However, the one-way clutch F1 may not be provided, and the first gear stage "1st" may be formed through engagement of the frictional engagement device (the brake B2). In short, the automatic transmission 22 may be any type of automatic transmission as long as a plurality of gear stages having different gear ratios are selectively formed through selective engagement of any one or ones of a plurality of engagement devices.

Besides, in the foregoing embodiment of the disclosure, the engine 12 is exemplified as the driving force source of the vehicle 10, but the disclosure is not limited to this aspect thereof. For example, another prime mover such as an electric motor or the like can also be adopted alone or in combination with the engine 12, as the driving force source. Besides, the power of the engine 12 is transmitted to the automatic transmission 22 via the torque converter 20, but the disclosure is not limited to this aspect thereof. For example, another fluid transmission device such as a fluid coupling with no action of torque amplification may be employed instead of the torque converter 20. Alternatively, this fluid transmission device is not absolutely required to be provided.

Incidentally, what is described above is nothing more than one mode of implementation. The disclosure can be implemented in aspects subjected to various alterations and improvements based on the knowledge of those skilled in the art.

What is claimed is:

1. A control apparatus for an automatic transmission with which a vehicle is equipped, comprising:
    an acceleration requirement determination unit configured to determine whether or not a drive requirement amount for the vehicle is larger than a predetermined requirement amount, and that determines whether an acceleration requirement is large or small, based on whether a change in the drive requirement amount is larger or smaller than a predetermined requirement amount change, when it is determined that the drive requirement amount is larger than the predetermined requirement amount; and
    a shift control unit configured to form a gear stage that is lower in vehicle speed than a predetermined gear stage by one stage when the acceleration requirement determination unit determines that the acceleration requirement is large, and that forms a gear stage that is higher in vehicle speed than the predetermined gear stage by one stage when the acceleration requirement determination unit determines that the acceleration requirement is small, in a case where the shift control unit determines that a shift to the predetermined gear stage, at which a maximum load is applied to a predetermined rotary member of the automatic transmission in which a plurality of gear stages having different gear ratios are selectively formed, is to be performed.

2. The control apparatus for the automatic transmission according to claim 1, wherein
    the shift control unit is configured to hold the gear stage that is lower in vehicle speed by one stage when it is determined that the acceleration requirement is large, and make an upshift to the gear stage that is higher in vehicle speed by one stage when it is determined that the acceleration requirement is small, in a case where the shift control unit determines that an upshift from the gear stage that is lower in vehicle speed by one stage to the predetermined gear stage is to be performed.

3. The control apparatus for the automatic transmission according to claim 2, further comprising:
    a running state determination unit configured to determine whether or not a running state of the vehicle is a predetermined running state where the drive requirement amount has remained larger than the predetermined requirement amount, a vehicle speed has risen, and a predetermined time or less has elapsed since an upshift from a gear stage that is lower in vehicle speed than the predetermined gear stage by two stages to the gear stage that is lower in vehicle speed by one stage, wherein
    the shift control unit is configured to make an upshift to the predetermined gear stage when the acceleration requirement determination unit determines that the drive requirement amount is larger than the predetermined requirement amount and the running state determination unit determines that the running state of the vehicle is the predetermined running state, in a case where the shift control unit determines that an upshift from the gear stage that is lower in vehicle speed by one stage to the predetermined gear stage is to be performed.

4. The control apparatus for the automatic transmission according to claim 1, wherein
    the shift control unit is configured to make a downshift to the gear stage that is lower in vehicle speed by one stage when the acceleration requirement determination unit determines that the acceleration requirement is large, and hold the gear stage that is higher in vehicle speed by one stage when the acceleration requirement determination unit determines that the acceleration requirement is small, in a case where the shift control unit determines that a downshift from the gear stage that is higher in vehicle speed by one stage to the predetermined gear stage is to be performed.

5. The control apparatus for the automatic transmission according to claim 1, wherein
    the shift control unit is configured to hold the gear stage that is lower in vehicle speed by one stage when the shift control unit determines that a shift to the gear stage that is lower in vehicle speed by one stage is to be performed, and make an upshift to the gear stage that is higher in vehicle speed by one stage when the shift control unit determines that a shift to the gear stage that is higher in vehicle speed by one stage is to be performed, in a state where the gear stage that is lower in vehicle speed by one stage is formed after the shift control unit determines that a shift to the predetermined gear stage is to be performed.

6. The control apparatus for the automatic transmission according to claim 1, wherein
the shift control unit is configured to hold the gear stage that is higher in vehicle speed by one stage when the shift control unit determines that a shift to the gear stage that is higher in vehicle speed by one stage is to be performed, and make a downshift to the gear that is lower in vehicle speed by one stage when the shift control unit determines that a shift to the gear stage that is lower in vehicle speed by one stage is to be performed, in a state where the gear stage that is higher in vehicle speed by one stage is formed after the shift control unit determines that a shift to the predetermined gear stage is to be performed.

7. The control apparatus for the automatic transmission according to claim 1, wherein
the shift control unit is configured to make a shift of the automatic transmission decided using a predetermined relationship, when the acceleration requirement determination unit determines that the drive requirement amount is equal to or smaller than the predetermined requirement amount.

8. The control apparatus for the automatic transmission according to claim 1, further comprising:
a torque control unit configured to reduce an input torque of the automatic transmission such that an output torque of the automatic transmission becomes equal to an output torque of the automatic transmission at a time when the predetermined gear stage is formed, in a case where the gear stage that is lower in vehicle speed by one stage is formed when the shift control unit determines that a shift to the predetermined gear stage is to be performed.

9. A control method for an automatic transmission with which a vehicle is equipped, comprising:
determining whether or not a drive requirement amount for the vehicle is larger than a predetermined requirement amount, and determining whether an acceleration requirement is large or small, based on whether a change in the drive requirement amount is larger or smaller than a predetermined requirement amount change, when it is determined that the drive requirement amount is larger than the predetermined requirement amount; and
forming a gear stage that is lower in vehicle speed than a predetermined gear stage by one stage when it is determined that the acceleration requirement is large, and forming a gear stage that is higher in vehicle speed than the predetermined gear stage by one stage when it is determined that the acceleration requirement is small, in a case where it is determined that a shift to the predetermined gear stage, at which a maximum load is applied to a predetermined rotary member of the automatic transmission in which a plurality of gear stages having different gear ratios are selectively formed, is to be performed.

* * * * *